Figure 1:
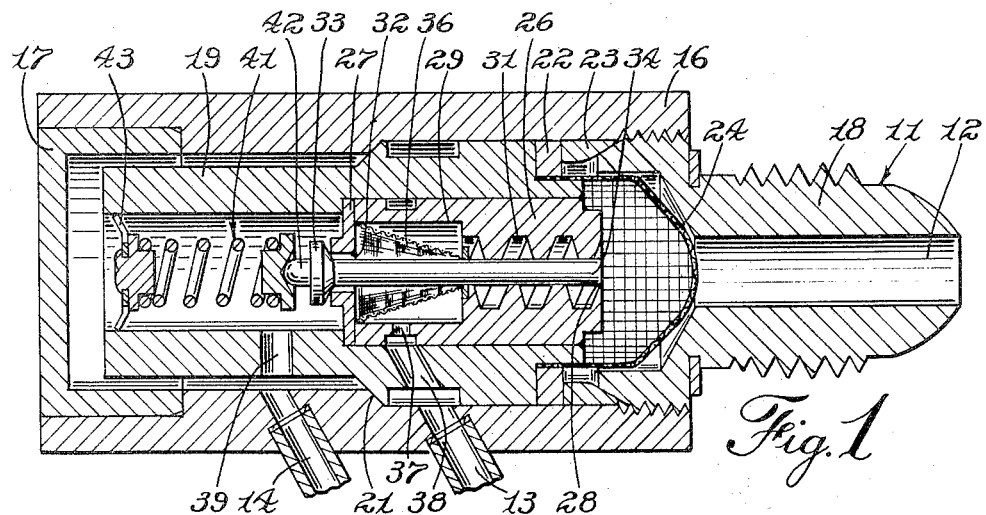

April 26, 1966 T. L. KUCMEROSKY 3,247,967
FLOW DIVIDER VALVE
Filed April 17, 1963

WITNESS:
Esther M. Stockton

INVENTOR.
Theodore L. Kucmerosky
BY John Phillip Ryan
ATTORNEY

United States Patent Office 3,247,967
Patented Apr. 26, 1966

3,247,967
FLOW DIVIDER VALVE
Theodore L. Kucmerosky, Elmira, N.Y., assignor to The Bendix Corporation, Elmira Heights, N.Y., a corporation of Delaware
Filed Apr. 17, 1963, Ser. No. 273,746
7 Claims. (Cl. 210—97)

The present invention relates to a flow divider valve and more particularly to a valve utilizing means for centrifugally forcing deleterious contaminants in a fluid fuel away from and clear of the bearing surfaces supporting the valve member as well as away from the valve seat-valve head surfaces and further utilizing means for effectively disposing of the contaminants.

Flow divider valves of the type herein disclosed are used primarily in jet engine fuel supply systems in combination with various types of atomizing nozzles. Irrespective of the type of nozzle used, it is desirable to effectively control the fuel supplied to the nozzle in an established relationship to the pressure of the fuel in the system. A flow divider valve serves as the fuel control means for each individual nozzle.

Contaminated fuels adversely affect the efficiency of prior art flow divider valves of this type by introducing deleterious contaminants between the valve and seat thereby making exact fuel control extremely difficult. Even the most minute particles of contaminants prevent complete closing of the valve and will adversely affect engine operation. Contaminants also have a detrimental effect on bearing surfaces of valve components causing improper valve action and premature bearing wear.

The prior art deficiencies have been overcome in the subject invention which comprises a support member having an axial bore an a helical groove or flute opening radially outwardly from the surface of the bore. The bore provides a bearing surface for a valve member. The flute communicates and meters fuel from an inlet to a point adjacent to an outlet. The fuel, when passing through the flute, is subjected to centrifugal force which creates a force on the deleterious contaminating particles urging the particles away from the surface of the bore radially outwardly into the portions of the flute. There are provided adjacent the outlet controlled by the valve member means for disposing of the contaminants in such a manner that the contaminants by-pass the valve and seat.

It is therefore an object of the present invention to provide a flow divider valve including therein means for centrifugally separating deleterious particles of contaminants in a fluid fuel to thereby prevent the detrimental effects which occur when these particles are trapped between the valve seat and valve head or between a bearing surface and a movably supported element or component.

It is a further object of the present invention to provide a flow divider valve which is simple, efficient, reliable, durable and economical.

It is another object of the present invention to provide helical groove or flute means for communicating fluid fuel between an inlet and an outlet wherein the fluid is subjected to centrifugal force and deleterious contaminating particles are caused to be forced clear of precision bearing surfaces.

It is another object of the present invention to provide means positioned in a flow divider valve adapted to receive separated particles of deleterious contaminants and further adapted to cause and divert the collected particles to by-pass precision valve head and seat surfaces.

With the above and other objects in view which will appear as the description proceeds, this invention resides in the novel construction, combination and arrangement of parts substantially as hereinafter described and more particularly defined in the appended claims, it being understood that such changes in the precise embodiments of the hereindisclosed invention may be made as come within the scope of the claims.

Figure 2:
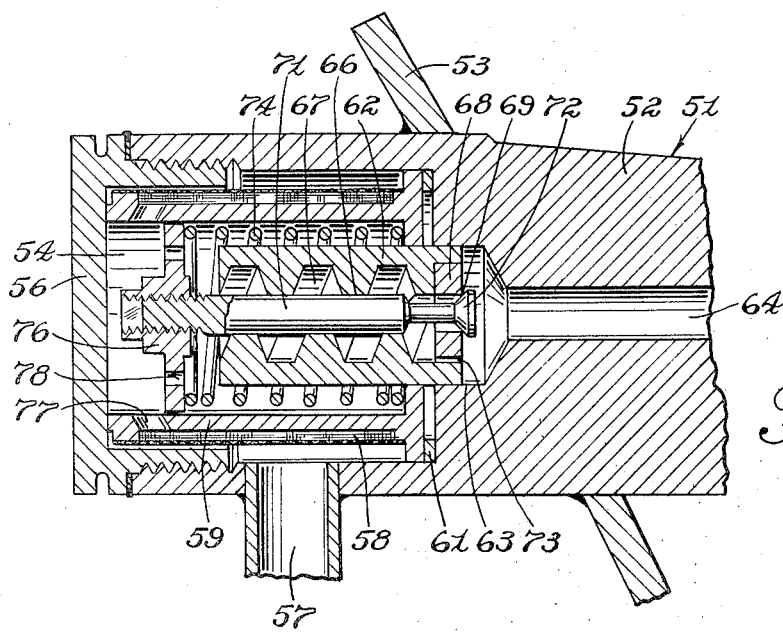

The accompanying drawing illustrates two complete examples of physical embodiments of the invention constructed according to the best mode so far devised for the practical application of the principles thereof, and in which:

FIGURE 1 is a side elevational view, in section and broken away, illustrating a flow divider valve embodying the present invention and adapted for use with a duplex type of nozzle; and FIGURE 2 is a side elevational view, similar to FIGURE 1, illustrating a second embodiment of the invention wherein the flow divider valve is adapted for use with an air assist type of nozzle.

Referring now to the drawing, in FIGURE 1 there is illustrated a flow divider valve, generally designated 11, operative to control a fluid fuel flow from the inlet 12 through a primary outlet 13 and a secondary outlet 14. A hollow housing 16 is closed at one extremity by cap 17 and has a threaded inlet fitting 18 affixed at the opposite extremity. A sleeve 19 positioned within the housing cavity is urged against a shoulder 21 by the inlet fitting acting in combination with a washer member 22 and a sealing ring 23. A relatively large mesh filter screen 24 is affixed to the washer 22 to initially filter incoming fluid fuel.

The sleeve 19 is provided with multidiametered axial bore. A support member 26 and a disc member 27 are fitted within the larger diameter of the sleeve bore. The support member in turn is provided with a centrally located axially extending bore 28 and a co-bore 29. The co-bore serves as an intermediate fluid reservoir. A helical groove or flute 31 coaxial with the support bore 28 is formed within the support to communicate and meter fluid between the inlet and support reservoir. The inner or minor diametral dimension of the groove opens into the support bore and, of course, the groove's outer or major diametral dimension extends radially outwardly therefrom. The disc 27 is provided with a central aperture 32 coaxial with the support bores 28 and 29. The aperture provides a precision valve seat for the valve head 33. The stem 34 of the valve member is slidably supported on the bore surface 28 defined by the ridges of the helical groove or flute 31.

A fine mesh frustoconical screen member 36 supported on the valve stem is positioned within the support reservoir 29 so as to protect the valve seat-valve head, hereinafter sometimes referred to as a secondary valve, from deleterious contaminating matter. Openings 37 and 38 in the support and sleeve, respectively, communicate between the support reservoir and the primary outlet 13. The right-hand end of the sleeve bore and a passage 39 communicate downstream of the secondary valve with the housing cavity which in turn connects directly to the secondary outlet 14.

A spring assembly, generally designated 41, is compressively confined between a nub 42 on the valve head and a retainer member 43 press fitted into the smaller diameter sleeve bore. The spring biases the valve toward and into engagement with the valve seat and is operative against the variable pressures exerted by the incoming fluid fuel.

In operation, fuel under varying pressures enters through the inlet 12 and is initially filtered by the screen 24 before it is metered and communicated by the helical groove or flute 31 to the reservoir 29 defined by the support co-bore 29. The fuel, when passing through the helical groove, is subjected to a swirling action thereby setting up a centrifugal force which acts upon any particles contaminating the fuel. The particles are thrown radially outwardly against the major diametral dimension of the groove and are propelled in a forward direction as well. Clean fuel will lubricate the surface of the valve stem slidably journalled in the bore 28 defined by the ridge portions of the groove. Thus particles and elements tending to form gums on the valve stems and bearing surfaces are effectively diverted away from the bearing surfaces. The fuel and particles carried thereby are deposited in the reservoir 29. The swirling fuel will accumulate in the reservoir 29 before being diverted to one of the outlets. When the fuel is above a predetermined pressure, the force of the fuel acting on the valve head 33 will cause the valve to move away from the valve seat 32 against the bias imposed by the spring assembly 41. The fuel passes through the screen filter 36 and through the secondary valve and passage 39 to the secondary outlet 14. Contaminants will be filtered by the screen 36 but the swirling fuel will continuously wash the surface of the screen and carry the particles and/or contaminants through passages 37 and 38 to and out the primary outlet 13. The intake of the contaminants will not be detrimental to the efficient operation of the primary system since the primary system's tolerances are not critical. When the fuel pressure is below the predetermined value all the fuel will wash the screen filter 36 and pass through the primary outlet.

A second embodiment of the invention is illustrated in FIGURE 2 wherein a flow divider valve, generally designated 51, is adapted for use with an air assist nozzle system. The air assist portion of the nozzle forms no part of the present invention and has not been illustrated. A body 52 having mounting flange 53 defines a hollow cavity 54 which is closed by a cap member 56. The inlet 57 communicates with the housing cavity. Fuel admitted by the inlet is filtered by the screen member 58 carried by a sleeve 59 confined within the housing cavity between a gasket 61 and the cap member 56.

A support member 62 is supported by the forward extremity of the sleeve and a bore 63 formed in the housing. The housing bore communicates with and forms an integral part of the outlet 64. The support has a centrally disposed bore 66 coaxial with the outlet. A radially outwardly extending flute or helical groove 67 communicates with the support bore. The inner diametral dimension of the flute defines the bore 66 and provides the bearing surface. The forward or right-hand extremity of the support bore supports a plug member 68 adapted to provide a valve seat 69. The valve member comprises a valve stem 71 and valve head 72 positioned in the support for reciprocal movements toward and away from the valve seat. The valve stem is supported on the bearing surfaces of the support bore as defined by the inner diametral dimension or ridges of the flute 67. The plug member has a metering orifice or calibrated restriction 73 communicating between the radially outermost diametral dimension of the flute and the bore 63 of the inlet 64. A spring 74 is compressively confined between the sleeve 59 and adjusting nut 76 threaded on the rear extremity of the valve stem. The spring biases the valve head 72 into engagement with the valve seat 69 against the variable pressure exerted by the incoming fuel.

In operation, incoming fuel under varying pressures is communicated to the housing cavity 54 by the inlet 57. The fuel passes through a filter 58 and passages 77 and 78 in the sleeve 59 and adjusting nut 76, respectively, to reach the helical flute 67. The fuel thereafter is metered and communicated by the flute to a point in the support bore 66 adjacent the plug member 68. When the fuel is above a predetermined pressure, the force exerted on the valve head 72 will be sufficient to actuate the valve member away from engagement with the valve seat 69 against the bias exerted by the spring 74 thereby allowing fuel to flow to the outlet 64.

The passage of fuel through the flute will subject the fuel to a swirling action causing any particles or contaminants in the fuel to be forced by centrifugal force to the outer or major diametral dimension of the flute. The particles or contaminants will be propelled in an axial direction toward the valve seat as well. The particles, since they are radially displaced from the center of the support, will not contaminate the support bearing surface 66 defined by the ridges of the flute to adversely affect the valve movement. The radially disposed particles will accumulate adjacent the plug at the calibrated restriction 73. In the illustration, a restriction is shown in an enlarged detail but it will be readily apparent that the restriction need not be larger than the largest particle size capable of passing through the filter screen 58. The restriction is continuously open and communicates with the outlet thereby constituting a calibrated leak. The amount of fuel leaked by the restriction or orifice is negligible. However, the leaked fuel will carry all the separated particles and contaminants and in this way the contaminants are effectively disposed of and caused to by-pass the critical valve seat-valve head surfaces. It will be appreciated that, while the restriction 73 is illustrated as communicating with the outlet, the arrangement is not so limited and the leaked fuel may be communicated to other desirable points, i.e., back to a fuel reservoir (not shown).

From the foregoing description taken together with the accompanying drawing, it will be readily apparent that this invention provides for the incorporation of novel means for the separation and disposal of deleterious contaminating particles when the fluid fuel is used in a precision critically dimensional flow divider valve.

I claim:
1. A valve comprising:
   a housing;
   a support member in the housing intermediate an inlet and an outlet;
   an axial bore in the support member communicating between the housing inlet and the housing outlet, the bore surface providing a bearing surface;
   a valve seat adjacent the outlet;
   a helical groove formed in the support member opening radially outwardly from the bore, said groove communicating a contaminated fluid between the inlet and the valve seat, said contaminated fluid being subject to centrifugal force within the groove whereby any particles of contaminants in the fluid are forced radially outwardly away from and clear of the bearing surface;
   a movable valve member supported on the bearing surface adapted for engagement with the valve seat;
   means upstream of the valve seat communicating with the groove for diverting and causing the particles of contaminants to by-pass the engageable surfaces of the valve seat-valve member; and,
   means for actuating the valve member.
2. A flow divider valve comprising:
   a housing including an inlet and an outlet;
   a support member positioned within the housing intermediate the inlet and the outlet;
   a bore centrally disposed in and axially extending through the support member, said bore including a spiral groove and a spiral ridge adjacent the peripheral portions thereof, the inner diametral dimension of the spiral ridge providing a bearing surface, the spiral groove communicating and metering a contaminated fluid medium between the inlet and outlet, said contaminated fluid being subjected to centrifugal force within the groove whereby any particles of contaminants in said fluid are forced radially outwardly away from and clear of the bore's bearing surface;
   means providing a valve seat for the outlet;
   a valve member carried by the bore's bearing surface adapted for reciprocal movements into and out of engagement with the valve seat for controlling the flow of metered fluid from the outlet;

means upstream of the valve seat communicating with the bore for disposing of the particles of contaminants whereby the particles are prevented from detrimentally affecting valve member engagement with the valve seat; and, means for actuating the valve member into engagement with the valve seat against the force of the fluid.

3. In a valve for handling a contaminated fluid fuel medium and having a valve member adapted to cooperate with a valve seat for opening and closing an outlet, comprising:

a support member;

a bore in the support member extending axially through the support member and providing a bearing surface for the valve member;

a helical groove, having major and minor diametral dimensions, formed in the support member for communicating and metering the fluid between an inlet and the outlet, said groove at its minor diametral dimension opening into the bore, said contaminated fluid being subject to centrifugal force while traversing said helical groove whereby any particles of contaminants in said fluid are forced toward the major diametral dimension away from and clear of the bearing surface;

means adjacent the valve seat and downstream of the helical groove for diverting and causing the contaminants to by-pass the valve seat; and, means for actuating the valve member.

4. A flow divider valve comprising:

a hollow body including an inlet and a plurality of outlets;

a support member secured within the body, said support member having an axially extending bore formed therein, the surface of said bore providing a bearing surface;

a helical flute formed in the support, said helical flute extending the axial length of the support bore and radially opening into the bore, said flute communicating and metering a contaminated fuel between the inlet and a point adjacent the outlets, said communicated fuel being subjected to centrifugal force within the flute whereby any particles of contaminants in the fuel are forced radially outwardly away from and clear of the bearing surface;

a valve seat for one of the outlets;

a valve member positioned within the bore and engageable with the valve seat, said valve further adapted for reciprocal movements toward and away from the valve seat;

filter means intermediate said point adjacent the outlets and said one outlet positioned so that a portion of the fuel flow from the flute continuously washes said filtering means and carries the particles of contaminants out the other of the said outlets whereby the particles of contaminants are prevented from detrimentally affecting valve member engagement with said valve seat; and, means for actuating the valve member in said reciprocal movements.

5. A flow divider valve comprising:

a hollow body portion including an inlet and an outlet;

a support member secured within the body, said support member having an axially extending bore formed therein, a surface of said bore providing a bearing surface;

a valve seat for the outlet positioned in the bore adjacent the outlet;

a helical flute formed in the support member, said helical flute extending between the inlet and the valve seat, said flute radially opening into the bore and communicating and metering a contaminated fluid between the inlet and a point upstream of the valve seat, said contaminated fluid being subject to centrifugal force within the flute whereby any particles of contaminants in said fluid are forced radially outwardly away from and clear of the bearing surface;

a cylindrical valve member engageable with the valve seat and positioned within the bore for reciprocal movements toward and away from the valve seat;

an orifice communicating between said point upstream of the valve seat and the outlet to provide a calibrated discharge path for the particles of contaminants; and, means for actuating the valve member in said reciprocal movements.

6. A flow divider comprising:

a hollow body having an inlet, a primary outlet and a secondary outlet;

a support member secured within the body intermediate the inlet and the secondary outlet, said support member having an axially extending bore formed therein communicating between the inlet and a point adjacent the outlets, portions of the bore's surface providing a bearing surface;

a helical groove formed in the support coaxial with the support bore and opening radially outwardly from the bore, said groove having the same axial length as the bore, said groove communicating and metering a contaminated fluid from an inlet to a point adjacent the primary outlet, said contaminated fluid being subjected to centrifugal force within the groove whereby any particles of contaminants are forced radially outwardly away from and clear of the bore's bearing surface;

means intermediate the support and the secondary outlet providing a valve seat;

a cylindrical valve member slidably supported on the bearing surface for reciprocal movements toward and away from engagement with the valve seat for controlling the fluid flow through the secondary outlet;

the frustoconical screen member supported by the valve member and the support member intermediate the downstream extremity of the helical groove and the valve seat, said screen member filtering the fluid flow to the secondary outlet and to be continuously washed by the fluid flow to the primary outlet whereby the particles of contaminants are flushed out the primary outlet and by-pass the secondary valve seat-valve member surfaces; and, means, including a spring member, supported within the housing and cooperating with the valve member for biasing the valve member into engagement with the valve seat and overcoming the force of the fluid.

7. A flow divider valve comprising:

a hollow body having an inlet and an outlet;

a support member secured within the body intermediate the inlet and outlet, said support member having an axially extending bore formed therein communicating between the inlet and the outlet, portions of the bore's surface providing a bearing surface;

means in the bore providing a valve seat;

a helical groove formed in the support member coaxial with the support bore and opening radially outwardly from the bore, said groove having substantially the same axial length as the bore, said groove communicating and metering a contaminated fuel from the inlet to a point adjacent the valve seat, said contaminated fuel being subjected to centrifugal force within the groove whereby any particles of contaminants in the fuel are forced radially outwardly away from and clear of the bore's bearing surface;

a cylindrical valve member slidably supported on the bearing surface for reciprocal movement toward and away from engagement with the valve seat;

a metering restriction communicating between the downstream end of the groove immediately adjacent the valve seat and the outlet, said restriction being radially positioned relative to the groove and bore to receive the centrifugally separated particles of contaminants and providing a calibrated leakage to by-pass the engageable valve seat and the valve member surfaces whereby the particles of contaminants are disposed of and prevented from adversely affecting valve member engagement with the valve seat; and, means, including a spring member, supported within the housing and cooperating with the valve member for biasing the valve member into engagement with the valve seat and overcoming the force of the fuel.

References Cited by the Examiner

UNITED STATES PATENTS

| | | | |
|---|---|---|---|
| 829,462 | 8/1906 | Curtin | 251—126 |
| 1,840,309 | 1/1932 | Curtin | 251—126 X |
| 3,109,809 | 11/1963 | Verrando | 210—130 |
| 3,120,490 | 2/1964 | Samson | 210—409 X |

REUBEN FRIEDMAN, *Primary Examiner.*

D. M. RIESS, *Asssitant Examiner.*